Aug. 28, 1962
H. P. HOVNANIAN
3,051,166
ENDOSCOPE
Filed Dec. 1, 1959
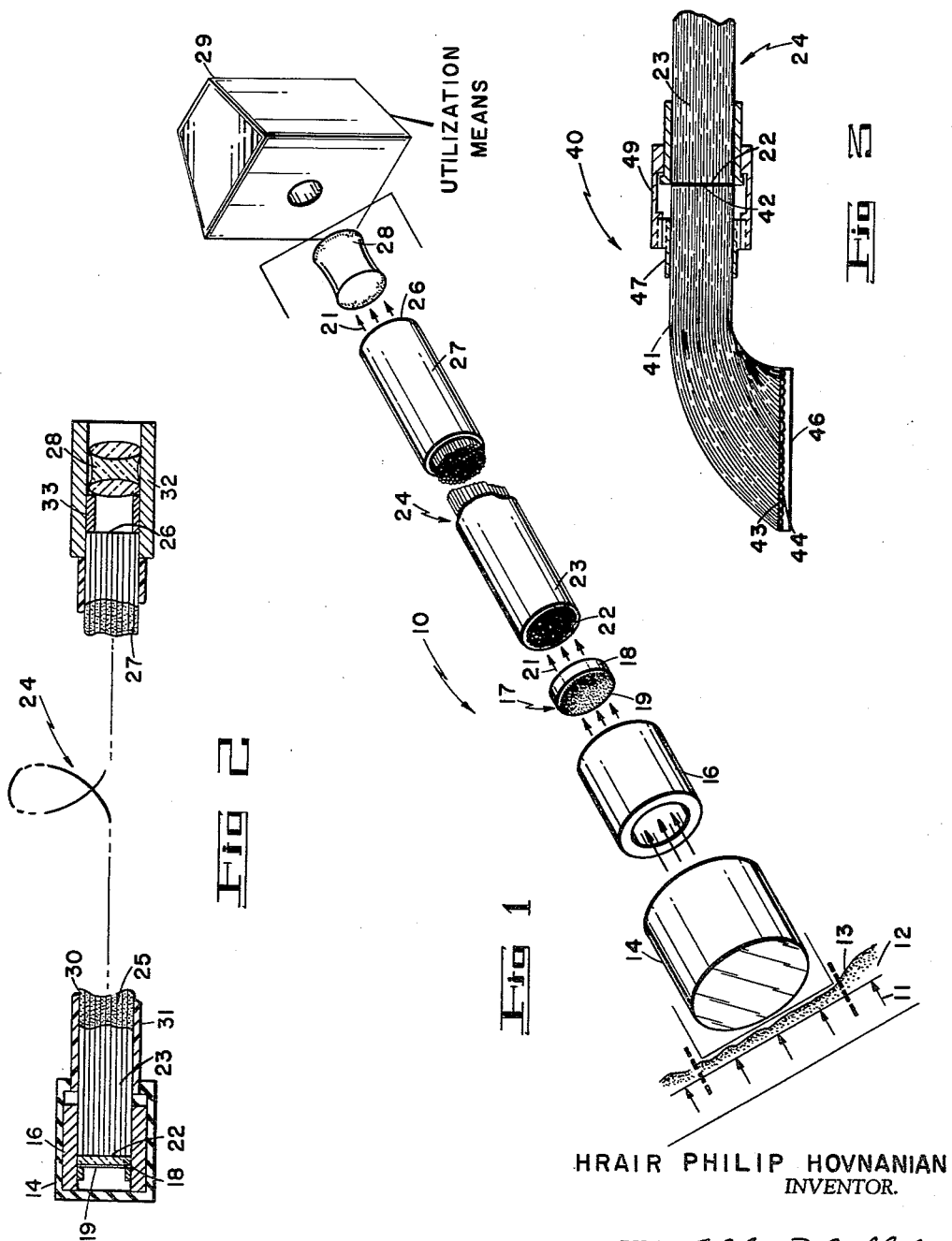
HRAIR PHILIP HOVNANIAN
INVENTOR.
BY
ATTORNEYS United States Patent Office 3,051,166
Patented Aug. 28, 1962

3,051,166
ENDOSCOPE
Hrair Philip Hovnanian, Winchester, Mass., assignor to Avco Corporation, Cincinnati, Ohio, a corporation of Delaware
Filed Dec. 1, 1959, Ser. No. 856,455
10 Claims. (Cl. 128—4)

This invention relates to endoscopic devices and in particular to an endoscope which is used in conjunction with radiated energy.

Heretofore, medical and dental practitioners have employed radiated energy to penetrate the inner regions of the human body to examine structures contained therein. The most common form of energy used today is X-rays, although effective use is being made of gamma and beta rays emitted by radium.

Generally, the procedure has been to provide a source of radiated energy, X-rays for example, adjacent to one side of the body or limb, and to position a sensor diametrically opposite the energy source. Both the energy source and the sensor are situated externally. The radiated energy is directed through the body or limb to the sensor where the radiated energy is converted to a visible light image.

The light image usually lacks definition and comprises, typically, a blurred shadow-like image of the particular structure under investigation. A blurred image results because it is generally impossible to locate the sensor in an abutting position to the structure being observed. The image, in other words, resembles a shadow cast on a wall of an object which is not adjacent to the wall.

A further limitation of conventional techniques relates to the magnitude of the invisible radiated energy required to obtain an acceptable image. As previously mentioned the radiated energy must pass through the entire body or limb. The amount of energy required to excite the sensor is related to the depth of body tissue separating the energy source and the sensor used. For a given sensor, the hazard these rays represent to the well being of an individual increases with their magnitude. It follows that if the sensor can be placed near the structure being observed the intensity of the radiation required can be substantially reduced.

It is an object of the invention to provide an endoscope which avoids the disadvantages and limitations of prior systems for examining internal structures of the human body.

It is another object of the invention to provide an endoscope which is capable of providing a high definition image.

It is still another object of the invention to provide an endoscope which includes means for converting radiated energy to a visible image.

It is still another object of the invention to provide an endoscope which makes it possible to reduce, considerably, X-ray exposure.

Other objects of the invention are to provide a mechanically flexible endoscope which:

(1) Is versatile, easily manipulated, and capable of being manufactured inexpensively;

(2) Can be placed adjacent to an internal structure of the body for providing a high definition image;

(3) Can be adapted to function with different forms of invisible radiation;

(4) Has a small over-all outside diameter to facilitate its use within the body;

(5) Is completely safe for use within a human body;

(6) Includes magnetic means for enabling a physician to guide the endoscope within the body; and (7) Includes sensor assemblies that may easily be interchanged for specific applications.

It is an object of the invention to provide an end scope employing a fiber optic light transmission means, the fiber optic light transmission means being lubricated to minimize breakage of the light transmitting fibers.

In accordance with the invention, an endoscope comprises light transmission means, preferably a fiber optic bundle, for transmitting light from a distal, or remote point, to a proximal, or viewing point. The endoscope also includes a sensor for converting radiated energy to a visible light image. The energy conversion means is in light communication with the distal end of the light transmission means for imparting a light image to the distal end. A protective covering, a cap for example, is placed over the sensor and distal end to prevent contamination of the sensor by body fluids and material and vice versa. The covering is transparent to the radiated energy.

Finally, the endoscope includes magnetic means, preferably a magnet positioned at the distal end of the fiber optic light transmission means to enable a physician to guide the distal end within a human body by means of an external magnetic field.

Also in accordance with the invention, the endoscope includes a fiber optic bundle. The fibers of the bundle are immersed in a lubricant to prevent abrasive destruction of the individual fibers when the endoscope is flexed.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIGURE 1 is an exploded schematic representation of an endoscope constructed in accordance with the principles of the present invention;

FIGURE 2 is a cross sectional representation of one form of an endoscope constructed in accordance with the principles of the present invention; and FIGURE 3 is a cross sectional representation of a sensor assembly attached to the distal end of a fiber optic bundle.

The most widely used technique for examining internal structures of the human body utilizes X-rays. Typically, to view an internal structure, X-rays are radiated to the structure through the body tissue and imparted to a sensing device on the opposite side of the internal structure, usually on the opposite side of the body from which the X-rays entered. The sensing device may be a photographic film or a fluoroscopic screen. In either case, however, since the X-rays entering the body do not constitute a point source, and since the sensing device is not adjacent to the structure being viewed, the image displayed on the sensing device has no clear definition and it is impossible to obtain an accurate and detailed image of the structure.

Furthermore, the X-rays must pass through the entire body to get to the sensing device. It will be recognized that "passed through the entire body" is used loosely in this instance. For example, where a finger is being X-rayed the rays must pass from one side of the finger to a sensing device on the diametrically opposite side. On the other hand, if the heart is being X-rayed the rays generally pass from the side of the shoulder blades to the opposite side or chest wall.

It is also quite obvious, that if the sensing device can be brought into contact with the internal structure under consideration the magnitude of the X-rays can be substantially reduced since they will be required to pass through less tissue and body structure. Furthermore, a high definition image can be obtained.

The combination of high intensity X-rays and poor definition often require prolonged exposure to X-rays for proper examination of the structure being viewed. As mentioned before, the medical and dental professions have long advocated the reduction of X-ray exposure since it is well know that X-ray can be harmful.

*Description and Operation of the FIGURE 1 Endoscope*

The schematic representation of an endoscope is shown in FIGURE 1. The various elements included in FIGURE 1 are included to illustrate, in a simple and facile manner, the function performed by the elements in the over-all endoscope. A detailed description of an embodiment of an endoscope will be discussed hereinafter with relation to FIGURE 2. Referring to FIGURE 1, the arrows 11 indicate a source of radiated energy, in this case X-rays will be assumed. The X-rays 11 are applied to the outside of a segment of the human body, designated 12 and pass through an area 13, delineated by dotted lines, which is to be viewed by the endoscope.

Shown adjacent to the surface 13 is a protective cap 14, formed from a suitable material which is transparent to X-rays, preferably rubber or plastic. After leaving the protective cap 14 the X-rays 11 pass through the passageway of a hollow cylinder 16. The cylinder 16 is made of magnetic material preferably a permanent magnet. In the cylindrical magnet 16 the X-rays are applied to a sensor or image converter 17. The sensor 17 comprises, preferably, a transparent disc 18 on which is deposited a phosphor 19 which acts to convert the X-rays 11 into visible light 21 shown leaving the rear of the sensor 17. While there are many materials which act to convert X-rays to visible light rays the use of cadmium sulfide, zinc sulfide, and zinc cadmium sulfide are recommended for these purposes. Barium platinocyanide can be used to convert gamma and beta rays emitted by radium.

The light rays 21 impinge on an end surface 22 at the distal end 23 of a fiber optic bundle 24 comprising a light transmission means. The image applied to the end surface 22 is transmitted to an end surface 26 at a proximal end 27 of the fiber optic bundle 24 and reformed on the end surface 26. The mechanism by which the light image is transferred from end surface 22 to end surface 26 is well known and is described briefly in the application entitled Image Forming and Transmitting Device, Serial No. 850,144, filed November 2, 1959, by the present applicant and assigned to the same assignee of this application.

The light image formed on end surface 26 is picked up by a projection lens 28, of a conventional nature and applied to a utilization device 29. Preferably, the utilization means 29 comprises a television system for converting the light image applied thereto into electrical signals. The television system then reconverts the electrical signals into an enlarged visual image of the structure 13 under examination.

*Description of the FIGURE 2 Endoscope*

The endoscope in FIGURE 2 includes all of the elements previously described in relation to the schematic representation in FIGURE 1. Components which are functionally the same as the components described in relation to FIGURE 1 will carry the same numerical designations. As seen in FIGURE 2 the light transmission means comprises a fiber optic bundle 24. The fiber optic bundle comprises a plurality of elongated fibers 25 terminated in distal and proximal ends which are cemented in substantially the same spatial relationship. The fiber optic bundle 24 includes a distal end 23 which has an end surface 22. Similarly, the opposite end, or proximal end 27, of the fiber optic bundle 24 includes an end surface 26. The fiber optic bundle 24 is enclosed in a plastic covering 31.

The center portions of these fibers are not cemented and can move relative to one another. Accordingly, to prevent abrasive destruction of these fibers when the endoscope is moved, a lubricant 30, preferably graphite, is inserted in the covering 31 and sealed therein. The fibers are immersed in the lubricant 30 which provides a protective, substantially friction-free, coating and materially reduces the danger of abrasive damage between adjacent fibers.

Sensor 17 is preferably cemented to the end surface 22 with the phosphor 19 remote from the end surface 22. The cylindrical magnet 16 surrounds the distal end 23 and the sensor 17. Finally, the rubber cap 14 is placed over the magnet 16 and in contact with the covering 31 to prevent body fluids or impurities from coming into contact with the sensing device and contaminating the phosphor 19.

The proximal end 27 of the fiber optic bundle 24 is inserted into a cylinder 32 which includes the projection lens 28. A spacer 33 is provided between the end surface 26 and the projection lens 28 for setting the latter at a prescribed minimum distance from the end surface 26, in accordance with the lens requirements. The cylinder 33 may be coupled in any convenient way to the utilization device 29.

*Description of FIGURE 3 Sensor Assembly*

The foregoing discussion has been limited to a sensor which is permanently secured to the distal end of the fiber optic light transmitting means. An alternative approach is to provide sensor assemblies which can be interchanged with relative ease to meet specific conditions related to the chosen subject under examination. Referring to FIGURE 3 of the drawings, there is shown an endoscope which includes a sensor assembly 40 that can be used for examining the oral cavity or structures in the body exposed in the course of a surgical procedure. The sensor assembly 40 includes a novel feature whereby it is possible to view a relatively large area, and to compress the image obtained into a more suitable size for transmission to a utilization means.

It will be noted that the sensor assembly 40 includes a tapered relatively short fiber optic bundle 41. A small end 42 of the bundle is in contact with the end surface 22 of the distal end for imparting light to the fiber optic bundle 24. An enlarged end 43 has deposited on it a phosphor 44, barium sulfide for example if X-ray observation is contemplated. The phosphor 44 is, in turn, covered by a protective coating 46 preferably a plastic material which, as mentioned before, is transparent to the radiation being used.

The area observed by the FIGURE 3 endoscope is determined by the area of the enlarged end 43 of the fiber optic bundle 41 assembly. The light imparted to the fibers at the large end 43 are transferred by total internal reflection to the small end. In constructing the fiber optic bundle 41 the fibers at the enlarged end 43 have a greater diameter than those at the small end 42. The image transmitted to the small end is compressed in size in transit. The process whereby an image is changed in size is completely reversible, and it is possible to magnify an image by acquiring it, at the small end 42 and transmitting it to the enlarged end 43. It has been found that the image is not distorted in the process of being reduced in size, nor is the initial resolution affected in any way. There is, of course, the necessity of providing improved amplification means in the utilization means. This does not pose any problem in closed circuit television systems, since the camera tubes are many times more sensitive than the human eye and have been known to operate satisfactorily at light intensity substantially lower than those found in the sensor assembly.

The assembly 40 includes a threaded sleeve 47 which is adapted to cooperate with a threaded coupling 49 in which the distal end 23 of the fiber optic bundle is inserted. Coupling 49 provides means for quickly changing sensor assemblies.

The tapered fiber optic bundle 41 is shown as a curved unit merely to demonstrate that the sensor can be fabricated in several different ways to accommodate special requirements. The illustrated configuration is particularly well adapted for use as an intraoral fluoroscope. In this connection, it can be used in (1) operative dentistry; (2) endodontia in route canal applications; and (3) in crown and bridge work, to examine the roots of teeth to determine their use as abutments, and many other dental procedures.

It is well to emphasize that it is possible with the present invention to reduce, materially, the exposure and the magnitude of X-rays, gamma and beta rays, employed in dental and medical examinations. In effecting the aforementioned reduction a material reduction in the hazard these rays represent to a patient is achieved.

It will be noted that there has been described an endoscopic device which is extremely versatile and easily manipulated. In many cases the sensor can be placed adjacent to the structure being examined for providing a high definition image, and when the sensor comprises a separate assembly as illustrated in FIGURE 3 it is possible to adapt the light transmission fiber optic bundle for use with several radiated energy sources.

Finally, the provision of the magnet on the distal end makes it possible to direct the endoscope from an external position.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In an endoscope an image converter and an image translator comprising: a sensing means for converting an invisible radiant energy image to a light image; and light image transmission means comprising a fiber optic bundle terminated by distal and proximal ends, the distal end being in light communication with said sensing means for receiving the light image therefrom.

2. In an endoscope an image converter and an image translator comprising: a sensing means for converting an invisible radiant energy image to a light image; a light image transmission means having distal and proximal ends, the distal end being in light communication with said sensing means for receiving the light image therefrom; and magnetic means secured to the distal end for enabling the distal end to be guided remotely.

3. In an endoscope having a proximal utilization means an image converter and an image translator comprising: a sensing means for converting an invisible radiant energy image to a light image; a light image transmission means comprising a fiber optic bundle terminated by distal and proximal ends, the distal end being in light communication with said sensing means for receiving the light image thereofrom; magnetic means secured to the distal end for enabling the distal end to be guided remotely; and coupling means attached to the proximal end for interconnecting the proximal end to the utilization means.

4. In an endoscope an image converter and an image translator comprising: a light image transmission means terminated by distal and proximal ends; sensing means attached to the distal end for converting an invisible radiant energy image to a light image and for imparting the light image to the distal end; a cap having a recess defined therein, the recess providing an opening in which said sensing means and the distal end are inserted, said cap being transparent to the invisible energy.

5. In an endoscope an image converter and an image translator comprising: a fabric optic bundle including a distal end surface; a light transparent disc having opposing faces, one of the faces being secured to the distal end surface, the remaining end surface having a phosphor for converting a radiated energy image to a light image deposited thereon; and a protective film covering the aforementioned phosphor for preventing contamination thereof, said protective film being transparent to the radiated energy image.

6. An endoscope as defined in claim 5 which includes, in addition, magnetic means secured to the fiber optic bundle adjacent to the distal end surface.

7. In combination in an endoscope: a fiber optic bundle having a distal end surface; a second fiber optic bundle terminated in end surfaces having unequal areas, one of which is in light communication with the distal end surface for imparting a light image to said first fiber optic bundle; and image converting means oriented to overlie the other end surface of the second fiber optic bundle for converting an invisible radiated energy image to a light image and for imparting the light image on said other end surface.

8. In combination in an endoscope: a fiber optic bundle having a distal end surface; a second fiber optic bundle terminated in a small and a large end surface, the small end surface abutting the distal end surface; means for converting invisible energy images to light images, said converting means being oriented to overlie the large end surface for imparting the light images to the large end surface.

9. In combination in an endoscope: a fiber optic bundle having a distal end surface; a second fiber optic bundle terminated in end surfaces having unequaled areas, one of which is in light communication with the distal end surface for imparting a light image on said distal end surface; image converting phosphor deposited on the other end surface of the second fiber optic bundle for converting an invisible radiated image to a light image end imparting the light image to said other end surface.

10. In an endoscope an X-ray image converter and light image translator comprising: a fiber optic bundle including a distal end surface; X-ray conversion means overlying the distal end surface for receiving and converting X-ray images to light images and for imparting the light image to said distal end surface; and protective means overlying said conversion means for preventing contamination thereof.

References Cited in the file of this patent
UNITED STATES PATENTS

| | | |
|---|---|---|
| 1,550,197 | Berry | Aug. 18, 1925 |
| 1,751,584 | Hansell | Mar. 25, 1930 |
| 2,311,704 | Simison | Feb. 23, 1943 |
| 2,555,424 | Sheldon | June 5, 1951 |
| 2,695,964 | Schepker | Nov. 30, 1954 |
| 2,825,260 | O'Brien | Mar. 4, 1958 |
| 2,863,458 | Modny et al. | Dec. 9, 1958 |
| 2,877,368 | Sheldon | Mar. 10, 1959 |